United States Patent Office 3,329,155
Patented July 4, 1967

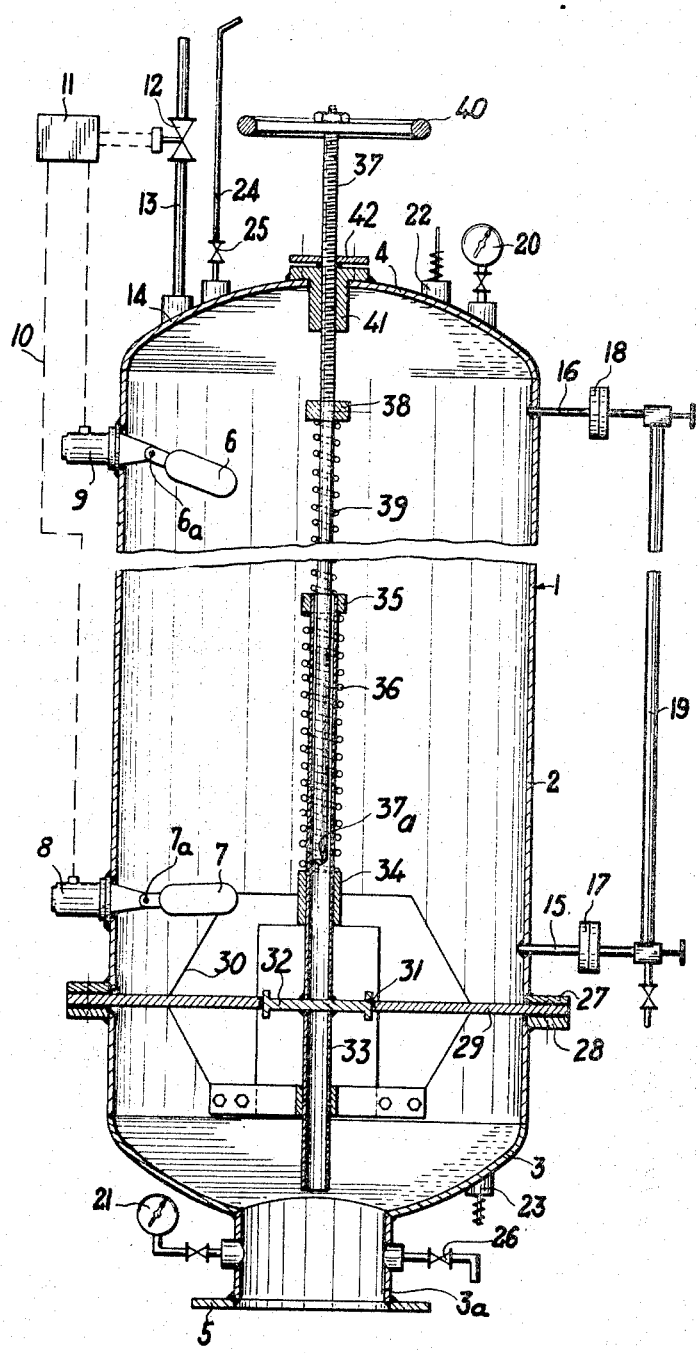

3,329,155
ANTI-HAMMER APPARATUS
Alfred Partos, Le Plessis-Robinson, France, assignor to Commissariat a l'Energie Atomique, Paris, France
Filed Dec. 19, 1963, Ser. No. 331,738
5 Claims. (Cl. 137—207)

The present invention relates to an apparatus intended for mounting on a conduit in which a liquid flows and which operates to avoid the detrimental consequences of sudden positive and negative pressures which are generally known as "hammer" effects, and which are liable to occur in a fluid conduit when a valve or a similar member is closed.

Many anti-hammer apparatus are already known which are capable of neutralising, in forced-flow conduits, the effects of successive and instantaneous negative and positive pressures occurring whilst an installation is operating. More particularly, apparatus are known which operate on the principle of compensating vertical conduits making is possible to dissipate the kinetic energy stored up in the mass of flowing liquid. In these apparatus, the absorption of energy is effected by making the surface of the liquid undergo a series of oscillations which are damped generally of their own accord owing to the friction of the liquid on the wall of the conduit. However, in cases where the hammer phenomena may be very close together and produce effects capable of being added to one another, the risk of resonance of the oscillatory phenomenon is not to be excluded, with all the disadvantages which this entails for the safety of the installations concerned. In order to be free of this danger, the compensating conduits are generally given a variable cross-section in such a manner as to form therein separate compartments connected by throttled portions increasing very considerably the pressure loss occurring when there are fluctuations in the level of the liquid. However, these apparatus have various disadvantages, since their constructional features are generally determined for a very specific working condition and cannot be considerably modified during operation, and consequently cannot be adapted to a network of interconnected conduits where variations in the rate of flow may be both very rapid and very considerable.

The present invention has as its object to obviate the aforesaid disadvantages by means of a simple and interchangeable apparatus with manual or automatic regulation which is capable of being used with a particularly wide operating margin in order to provide permanent protection for an installation, whatever the disturbances which might result from tests, bringing into operation, full working and running-down of the installation.

According to the invention the apparatus is characterised in that it comprises a tank of specific volume communicating with the conduit to be protected through a connecting flange, at least two detecting devices serving to indicate the height of the free level of the liquid within the tank, and a pipe which is connected to the upper portion of the tank and is provided with an electromagnetic valve determining the admission of a neutral gaseous fluid under pressure which forms a damping cushion above the surface of the liquid, the electromagnetic valve being controlled by any suitable signal given by the detecting devices, so that negative or positive pressures due to hammer in the conduit are absorbed at any time by reason of, the elasticity of the gaseous cushion on the one hand, and of the relationship established between the gaseous fluid and liquid pressures on the other hand during the entire duration of the disturbance.

The control of the electromagnetic valve by the relative position of the free surface level of the liquid in the tank makes it possible for the volume of the gaseous fluid to be reduced or increased in dependence upon external circumstances, and consequently to reduce or increase the positive pressure in the conduit in a correlated manner.

If the actual volume of the tank is insufficient to return the positive pressure due to the hammer to an acceptable value, the tank comprises means such as a calibrated valve arranged for example, in its upper end portion which valve permits on the one hand, some of the gaseous fluid to escape during the positive pressure period and on the other hand, a certain quantity of air to enter during the following negative pressure period. This action of the valve provides the tank with a useful volume which is considerably in excess of its actual volume. Furthermore, and according to a further feature of the invention, the tank is provided with a safety valve arranged at its lower end portion below the minimum level of the liquid, in order to effect possible discharge of a certain quantity of liquid if necessary when the values of successive positive and negative pressures exceed the values which can be absorbed either by the inherent elasticity of the gaseous cushion or by the calibrated valve provided at the upper end portion of the tank.

The initial conditions of operation, that is to say the height of the liquid surface level, the pressure of the gaseous fluid within the tank and the dimensions of the tank itself, being predetermined, the apparatus described hereinbefore may therefore be used for hammer values much greater than those which can be absorbed by a conventionel apparatus of the same size, and can therefore be adapted to considerably greater variations in the rate of flow of the liquid within the conduit.

Regulation of the operation of the gas-admission electromagnetic valve can be pneumatic, hydraulic or electrical, and can be effected continuously or discontinuously for example, the detection of the height of the liquid surface level can be effected by any suitable means and more particularly by means of floats connected to the internal wall of the tank and associated with magnetic contactors making it possible to determine the passage of the free surface level of the liquid at the level of the floats. The number of the detectors is of course determined by the dimensions of the tank. In a particularly simple form of embodiment, the number of floats can be reduced to two in order to detect only a "low" reference level and a "high" reference level of the liquid within the tank, the electromagnetic valve operating in this case with a two-step action depending on whether the surface level of the liquid ascends or descends, and causes the compression or expansion of the gaseous cushion.

Apart from these foregoing features, the anti-hammer apparatus according to the invention can be improved by adding to it a mechanical means for damping the oscillations of the liquid within the tank thus providing a rapid braking action on the ascending or descending movements of the liquid, so as to constantly limit the positive pressure to a permissible upper value.

For this purpose the apparatus comprises in the lower portion of the tank an annular diaphragm or disc having a central aperture in which there is vertically movable a flanged piston forming a double-acting valve member. The piston is equipped with a spring opposing its movement for braking the oscillations of the liquid in both directions. The piston may be provided with a pre-regulating system for adjusting the loading of the opposing spring in its inoperative condition, this system comprising a second spring compressed by an operating rod whose position is controlled from outside the tank by a handwheel which is manually operated or is operated by any suitable servo-control.

The invention will now be described by way of example with reference to the accompanying drawing the single figure of which is a diagrammatic vertical sectional view of an anti-hammer apparatus according to the invention.

The preferred embodiment of the apparatus of the invention as shown in the drawing comprises a tank 1 constituted by a cylinder 2 on which are fixed, for example by welding, a lower end plate 3 and an upper end plate 4 of spherical form. The end plate 3 is provided axially with a connecting neck 3a terminating in a flange 5 whereby the tank can be fixed to a conduit (not shown) in which any desired liquid flows, the said liquid thus penetrating within the tank 1 up to a specific surface level the height of which depends on the static pressure of the liquid. In order to determine this height, various detecting devices are mounted on the internal wall of the tank. In the embodiment illustrated, these devices are two in number and are constituted by two floats 6 and 7 which are pivotably mounted on the internal wall of the cylinder 2 on pivots such as 6a and 7a, and are associated with two magnetic contactors 8 and 9 situated externally of the tank. The two floats are thus arranged in such a manner that they permit the movement of the liquid from a low level (float 7) to an upper level (float 6), the signals supplied by the contactors 8 and 9 being transmitted by leads such as 10 to a control device 11 effecting the opening or closing of an electromagnetic valve 12 mounted on a pipe 13. The circuitry between contactors 8 and 9 and control device 11 for maintaining the circuit in the same condition when contact 9 is opened until contact 8 is opened is conventional and well known in the art and such circuits are found in U.S. Patent Nos. 1,136,657; 1,199,936; 1,530,929; and 2,049,931. The pipe 13 is connected to the upper part of the tank, extending through a sealing-tight passage 14 and provides communication, when the electromagnetic valve is opened, between the interior of the tank and a source of compressed neutral gas (not shown).

Other bores are formed in the walls of the tank so as to provide for a certain number of supervising and safety devices. By way of example the drawing shows two connecting pipes 15 and 16 connected respectively by flanges such as 17 and 18 to a transparent tube 19 which thereby indicates the surface level of the liquid within the tank and thus permits an operator to follow the variations in the said surface level visually. Two pressure gauges 20 and 21, situated at the upper and lower portions of the tank on the end plates 4 and 3, make it possible to ascertain at any time the pressure of the liquid and of the neutral gas in the tank. A relief valve 22 is mounted in the upper end plate 4, this valve being calibrated to prevent the gas pressure from exceeding a maximum value beyond which the tank and the members which it carries could be damaged. Also fixed on the lower end plate 3 is a second safety valve 23 which is also calibrated but to a value greater than that of the valve 22, so as to operate only in the event of the liquid completely filling the tank after having expelled all the gas through the valve 22. The valve 23, therefore, merely provides additional security, any possible discharge being effected almost instantaneously through the valve 22 where the pressure losses are always less than at the liquid end of the tank.

The upper end plate 4 is also provided with a pipe 24 having a valve 25 which permits communication between the atmosphere and the interior of the tank whenever necessary, more especially when it is desired to completely empty the tank, an operation which is effected by means of a discharge valve 26 arranged at the lower portion of the tank in the connecting neck 3a.

According to a further feature of the invention, the tank 1 is also provided with a mechanical means for damping the oscillations of the liquid in the tank. For this purpose, the cylinder 2 comprises two intermediate flanges 27 and 28 having a disc 29 clamped between them in sealing-tight manner. The disc 29 is held in a horizontal position within the tank by webs or struts forming a supporting framework 30. At its centre, the disc 29 has an aperture 31 in which slides a piston 32 constituting a form of valve member. The piston 32 is fixed on a hollow shaft 33 capable of sliding in a guide ring 34 secured to the framework 30. At its upper end, the shaft 33 terminates in a shoulder 35 on which bears an opposing spring 36 mounted coaxially about the shaft 33 and held at its other end on the upper portion of the ring 34. The tension of the spring 36 in its inoperative condition is determined by means of a regulating system which is manually controlled for example, by a rod 37, lower end 37a of which extends into and slides within the hollow shaft 33. The rod 37 is provided at its intermediate portion with a collar 38 between which and the shoulder 35 is located a second spring 39 whose action opposes the action of the spring 36. The initial position of the rod 37, that is to say the initial compression of the springs 36 and 39, is regulated by means of an operating handwheel 40 fixed externally of the tank on the upper end of the rod 37. The rod 37 is screw-threaded over a sufficient length and extends through the upper end plate 4 by means of a sealing-tight system 41 secured to a nut 42 so that rotational movement of the handwheel causes the movement of the rod 37 in one or other direction and the compression or relaxation of the springs.

The apparatus which has just been described operates in the following manner:

When a valve, for example, causes an instantaneous variation in the flow rate of the liquid within the conduit system on which the anti-hammer apparatus is mounted, the liquid begins to "build up" in front of the valve aperture, causing within the liquid an instantaneous positive pressure which is directed n the directon of flow and then, immediately afterwards, a negative pressure due to the opposite reaction resulting from the impact of the liquid against the closure member. The shock wave thus caused has repercussions over the whole length of the conduit and causes, in a first stage for example, the liquid surface level to rise within the tank 1. When this reaches the float 6, it causes the instantaneous opening of the electromagnetic valve 12 and the admission into the tank of a certain quantity of gas under pressure, which gradually opposes the ascent of the liquid and thus dissipates the kinetic energy stored in the liquid. When the liquid surface level begins to descend and then reaches the float 7, the electromagnetic valve 12 is operated in the closing sense and stops the admission of gas into the tank. Thus, the liquid surface level returns gradually by successive upward and downward movements to the condition of equilibrium in which it was before the hammer was caused by the closing of the valve.

Moreover, during fluctuations of the liquid level in the tank, the valve 32 always tends to oppose the upward and downward movements, thereby acting as a brake on the moving mass of liquid, the effectiveness of the braking action depending on the adjustment effected by the operating handwheel 40 in accordance with the particular working conditions of the installation.

Having regard to the foregoing, it should be noted that in all cases the ratio of the volumes of the fluids present (gas and liquid) is directly dependent on the position occupied by the dividing surface level within the tank.

Thus, the admission of gas is more considerable in proportion as the liquid rises to a higher level, the pressure being, however, cut down at an upper value by discharge through the safety valve 22, in order to avoid values which are dangerous to the satisfactory operation of the tank and the parts connected thereto.

Whatever the variations in the rate of flow, the useful volume thus always remains adequate because it is adapted in every case to the working conditions prevailing in the system. Possible dissolving of the gas in the liquid is also automatically compensated for by the principle of control for the electromagnetic valve controlling admission, the additional volume necessary for the breathing of the tank being always provided in order to ensure that the apparatus operates under the best conditions.

The invention is not, of course, in any way limited to the form of embodiment described and illustrated here, which has been given merely by way of example. In particular, it will be noted that the nature of the damping gas may be quite optional, and that the gas will preferably be chosen in accordance with the physical and chemical qualities of the liquid flowing in the conduits. Generally, atmospheric air in a more or less dry state or a neutral gas such as nitrogen will be used.

I claim:
1. An anti-hammer apparatus for protecting a conduit through which a liquid flows against successive positive and negative pressures comprising a tank of specific volume communicating with the conduit to be protected through a connecting flange, at least two detecting devices for ascertaining upper and lower limits of the height of the free surface level of the liquid within the interior of the tank, a pipe connected to the upper portion of the tank, an electromagnetic valve in the pipe determining the admission of a neutral gaseous fluid under pressure which forms a damping cushion above the surface level of the liquid, the electromagnetic valve being operated by the detecting devices, the operative relationship between the detecting devices and the electromagnetic valve being such that when the upper limit is reached upon rising of the free surface level the valve is opened and when the lower level is reached upon the falling of the free surface level the valve is closed and calibrated safety valves mounted at the upper and lower ends of the tank limiting the pressure of the gas and the pressure of the liquid, respectively, whereby the positive and negative pressures caused by hammer in the conduit are absorbed the elasticity of the gaseous cushion and the relationship established between the pressures of the liquid and the gaseous fluid during the entire duration of the disturbance.

2. An anti-hammer apparatus according to claim 1, characterized in that the detecting devices are constituted by floats connected to the internal wall of the tank and associated with magnetic contactors whereby the passage of the free surface level of the liquid past each float can be determined.

3. An anti-hammer apparatus according to claim 1, characterized in that the upper gas pressure valve is calibrated to a lower operating pressure than that of the lower valve.

4. An anti-hammer apparatus according to claim 1, characterized in that the tank is provided internally with an annular diaphragm or disc having a central aperture in which a flanged piston acting as a double-acting valve member is vertically movable, said piston being equipped with spring means which opposes its movements in order to brake the oscillations of the liquid in both directions of movement.

5. An anti-hammer apparatus according to claim 4, characterized in that the piston is provided with a regulating system for adjusting the loading of the spring in its inoperative condition, said system comprising a second spring which is compressed by an operating rod whose position is controlled from outside the tank by manual means such as a handwheel.

References Cited
UNITED STATES PATENTS

| | | | |
|---|---|---|---|
| 1,937,149 | 11/1933 | Holveck | 137—568 |
| 2,290,788 | 7/1942 | Wilson | 138—26 |
| 2,583,060 | 1/1952 | Paulsen | 137—209 |
| 2,740,357 | 4/1956 | Plank | 138—26 X |
| 2,871,870 | 2/1959 | Peters | 137—207 |
| 3,146,796 | 9/1964 | Everett | 137—207 X |

FOREIGN PATENTS 328,654   5/1930   Great Britain.

ALAN COHAN, *Primary Examiner.*